(12) United States Patent
Loe

(10) Patent No.: US 10,599,607 B2
(45) Date of Patent: Mar. 24, 2020

(54) METHOD AND SYSTEM FOR INTERPRETING CLICKS ON A MULTI-FUNCTION INPUT DEVICE

(71) Applicant: Texas Instruments Incorporated, Dallas, TX (US)

(72) Inventor: Stephen Boatner Loe, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 242 days.

(21) Appl. No.: 15/360,737

(22) Filed: Nov. 23, 2016

(65) Prior Publication Data

US 2018/0046596 A1 Feb. 15, 2018

Related U.S. Application Data

(60) Provisional application No. 62/373,163, filed on Aug. 10, 2016.

(51) Int. Cl.
*G06F 3/033* (2013.01)
*G09G 5/08* (2006.01)
*G06F 15/02* (2006.01)
*G06F 3/0354* (2013.01)

(52) U.S. Cl.
CPC ......... *G06F 15/02* (2013.01); *G06F 3/03547* (2013.01)

(58) Field of Classification Search
CPC .............................. G06F 15/02; G06F 3/03547
See application file for complete search history.

(56) References Cited

U.S. PATENT DOCUMENTS

| | | | |
|---|---|---|---|
| 2006/0136156 A1* | 6/2006 | Fender | G01R 1/02 702/68 |
| 2010/0207882 A1* | 8/2010 | Bruneau | A63F 13/06 345/161 |
| 2012/0046071 A1* | 2/2012 | Brandis | G06F 1/1694 455/556.1 |

* cited by examiner

*Primary Examiner* — Insa Sadio

(74) *Attorney, Agent, or Firm* — Rose Alyssa Keagy; Charles A. Brill; Frank D. Cimino

(57) ABSTRACT

A method for interpreting clicks on a multi-function input device included in a digital device is provided that includes receiving a click from the multi-function input device, determining a position of the click on the multi-function input device and a cursor displayed on a display comprised in the digital device, performing an action according to the position of the click when the cursor is a cursor designated as a cursor requiring a click at a specific position on the multi-function input device, and performing an action associated with the cursor when the cursor is a not a cursor designated as a cursor requiring a click at a specific position on the multi-function input device. A digital device is also provided that includes a multi-function input device, a display, a memory storing software instructions for performing the method, and a processor to execute the software instructions.

14 Claims, 2 Drawing Sheets

METHOD AND SYSTEM FOR INTERPRETING CLICKS ON A MULTI-FUNCTION INPUT DEVICE

CROSS-REFERENCE TO RELATED APPLICATIONS

This application claims benefit of U.S. Provisional Patent Application No. 62/373,163 filed Aug. 10, 2016, which is incorporated herein by reference in its entirety.

BACKGROUND OF THE INVENTION

Field of the Invention

Embodiments of the present invention generally relate to multi-function input devices and more specifically relate to interpreting clicks on a multi-function input device.

Description of the Related Art

Some handheld devices, e.g., the TI-Nspire™ CX and TI-Nspire™ CX CAS handheld devices, have a small touchpad for user input. The touchpad, which detects finger position, may be mounted on a switch to enable user input typically referred to as a click. The combination of finger position and click enable a variety of actions which would otherwise need to be enabled through additional keys on the keyboard on the handheld device. A click on the touchpad may be translated into one of five actions depending on the finger position, left, right, top, bottom, or center, on the keypad. For a center click to be accurately detected, the finger of a user needs to be properly centered on the small touchpad, which requires precision and dexterity that is problematic for some users given the small form factor of the touchpad.

SUMMARY

Embodiments of the present invention relate to methods and systems for interpreting clicks on a multi-function input device. In one aspect, a method for interpreting clicks on a multi-function input device included in a digital device is provided that includes receiving a click from the multi-function input device, determining a position of the click on the multi-function input device and a cursor displayed on a display comprised in the digital device, performing an action according to the position of the click when the cursor is a cursor designated as a cursor requiring a click at a specific position on the multi-function input device, and performing an action associated with the cursor when the cursor is a not a cursor designated as a cursor requiring a click at a specific position on the multi-function input device.

In one aspect, a digital device is provided that includes a multi-function input device, a display, a memory storing software instructions for interpreting clicks on the multi-function device, wherein the software instructions include software instructions to receive a click from the multi-function input device, determine a position of the click on the multi-function input device and a cursor displayed on the display, perform an action according to the position of the click when the cursor is a cursor designated as a cursor requiring a click at a specific position on the multi-function input device, and perform an action associated with the cursor when the cursor is a not a cursor designated as a cursor requiring a click at a specific position on the multi-function input device, and a processor coupled to the memory to execute the software instructions.

In one aspect, a method for interpreting clicks on a switch mounted touchpad included in a handheld device is provided that includes receiving a click from the touchpad, determining a position of the click on the touchpad and a cursor displayed on a display comprised in the digital device, performing an action according to the position of the click when the cursor is a cursor designated as a cursor requiring a click at a center position on the touchpad, and performing an action associated with the cursor when the cursor is a not a cursor designated as a cursor requiring a click at a center position on the touchpad.

In one aspect, a handheld device is provided that includes a switch mounted touchpad, a display, a memory storing software instructions for interpreting clicks on the touchpad, wherein the software instructions comprise software instructions to receive a click from the touchpad, determine a position of the click on the touchpad and a cursor displayed on the display, perform an action according to the position of the click when the cursor is a cursor designated as a cursor requiring a click at a center position on the touchpad, and perform an action associated with the cursor when the cursor is a not a cursor designated as a cursor requiring a click at a center position on the touchpad, and a processor coupled to the memory to execute the software instructions.

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1:
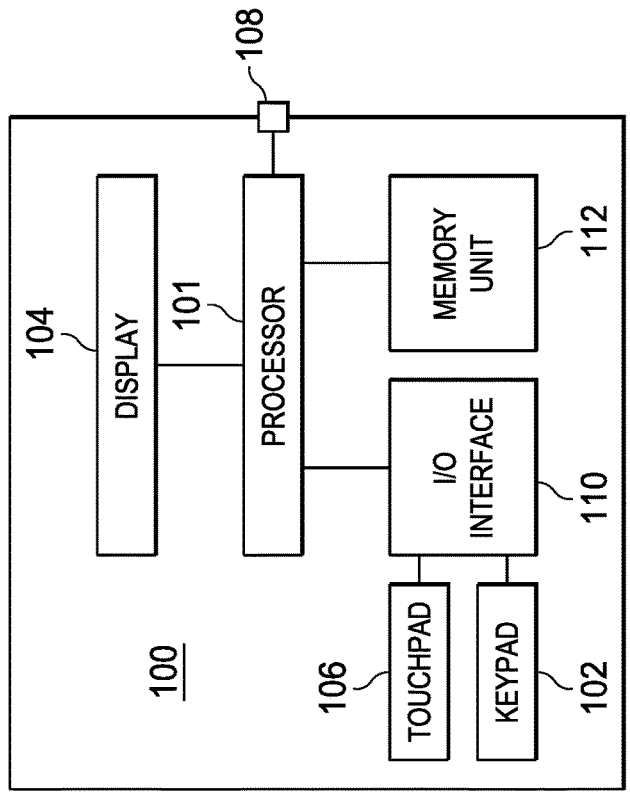
FIG. 1 is an example handheld device.
Figure 1:
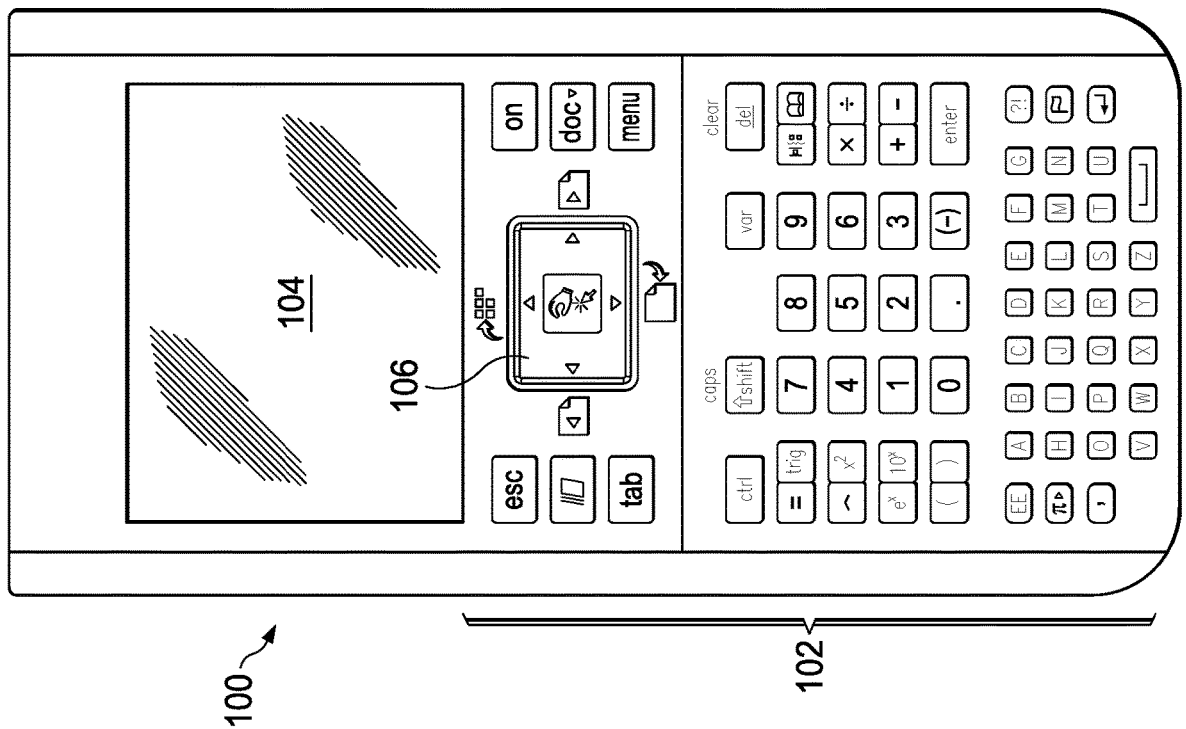

Specific embodiments of the invention will now be described in detail with reference to the accompanying figures. Like elements in the various figures are denoted by like reference numerals for consistency.

Embodiments of the disclosure provide for interpreting clicks on a digital device having a multi-function input device such as, for example, a handheld device with a switch mounted touchpad. Rather than requiring a center click on the input device to cause an action associated with the displayed cursor to be performed as in the prior art, a click at any click position on the input device causes the associated action to be performed when designated cursors are displayed on the display of the handheld device. If a cursor other than one of the designated cursors is present on the display, then the action associated with the cursor is performed only if the finger of the user is properly placed in the center of the input device. In effect, a larger click target area is allowed when any one of the designated cursors is displayed to improve usability.

FIG. 1 is an example of a handheld device 100 with a multi-function input device, i.e., a switch mounted touchpad 106. The handheld device 100 includes a graphical display 104, and a keypad 102 that includes the touchpad 106. The graphical display 104 may be used to display, among other things, information input to applications executing on the handheld device 100 and various outputs of the applications.

For example, the graphical display 104 may display various cursors depending on the particular application being executed. The graphical display 104 may be, for example, an LCD display.

The keypad 102 allows a user to enter data and functions and to start and interact with applications executing on the handheld device 100. The keypad 102 also includes an alphabetic keyboard for entering text. The switch mounted touchpad 106 allows a user to interact with the display 104 by translating the motion and position of a user's finger on the touchpad 106 to provide functionality similar to using an external pointing device, e.g., a mouse. A user may use the touchpad 106 to perform operations similar to using a pointing device on a computer system, e.g., scrolling the display 104 content, cursor positioning, selecting (clicking), highlighting, etc. The operation of the touchpad 106 is explained in more detail herein in reference to FIG. 2 and FIG. 3.

The handheld device 100 includes a processor 101 coupled to a memory unit 112, e.g., a computer readable medium, which may include one or both of memory for program storage, e.g., read-only memory (ROM), and memory for non-persistent data and program storage, e.g., random-access memory (RAM). In some embodiments, the program storage memory stores software programs and the memory for non-persistent data stores intermediate data and operating results. An input/output port 108 provides connectivity to external devices, e.g., a wireless adaptor or wireless cradle. In one or more embodiments, the input/output port 108 is a bi-directional connection such as a mini-A USB port. Also included in the handheld device 100 is an I/O interface 110. The I/O interface 110 provides an interface to couple input devices such as the touchpad 106 and the keypad 102 to the processor 101. In some embodiments, the handheld device 100 may also include an integrated wireless interface (not shown) or a port for connecting an external wireless interface (not shown).

Figure 2:
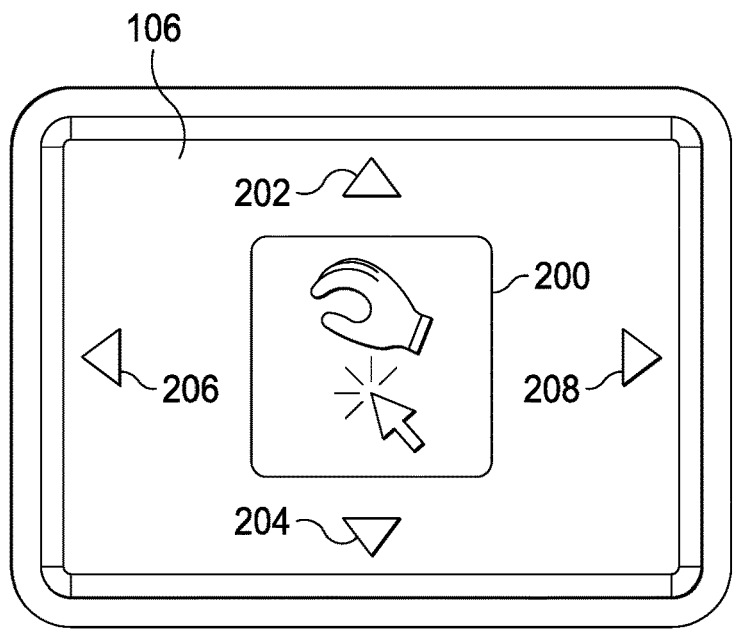
FIG. 2 shows the touchpad of the example handheld device of FIG. 1.

FIG. 2 shows the touchpad 106 in more detail. The surface of the touchpad 106 includes graphics indicating an action that may be performed when a user clicks the touchpad 106 in different areas. The graphics include a left arrow 206, a right arrow 208, an up arrow 202, a down arrow 204, and a center click area 200. The arrows indicate the direction of movement on the display 104 when the corresponding outside edge of the touchpad 106 is pressed or clicked. Touch navigation may be performed by sliding a finger tip on the touchpad 106 to activate and move a cursor on the display 104. The particular cursor or cursors displayed during the touch navigation depend on the application being executed. Table 1 is an example set of cursors that may be used in some embodiments.

TABLE 1

|   | Cursor Name | Center Click Only? | Usage |
| --- | --- | --- | --- |
| 1 | "default", "pointer" | Y | Used to show the position of the cursor |
| 2 | "hand pointer" | N | Indicates that the underlying object can be selected or activated with a click |
| 3 | "crosshair" | N | Used for fine control of a selection - often used to indicate the bounds of a rectangular region selection. |
| 4 | "hand open" | N | Indicates that the underlying object can be grabbed |
| 5 | "hand closed" | Y | Indicates that the underlying object has been grabbed |

TABLE 1-continued

|   | Cursor Name | Center Click Only? | Usage |
| --- | --- | --- | --- |
| 6 | "drag grab" | Y | Indicates that a pan type of operation is in progress |
| 7 | "rotation" | N | Indicates that the underlying object can be rotated and is also used to indicate that the rotation operation is ongoing |
| 8 | "translation" | N | Indicates that the underlying object can be translated and is also used to indicate that the translation operation is ongoing |
| 9 | "dilation" | N | Indicates that the underlying object can be dilated and is also used to indicate that the dilation operation is ongoing |
| 10 | "diag resize" | N | Indicates that a grab at this location will initiate a diagonal resize operation. A hand closed should be used during the resize operation. |
| 11 | "resize column" | N | Indicates that a grab at this location will initiate a resize column or horizontal resize operation. A hand closed should be used during the resize operation. |
| 12 | "resize row" | N | Indicates that a grab at this location will initiate a resize row or vertical resize operation. A hand closed should be used during the resize operation. |
| 13 | "zoom in" | N | Indicates that a click will result in a zoom in. |
| 14 | "zoom out" | N | Indicates that a click will result in a zoom out. |
| 15 | "zoom box" | N | Indicates that a click will initiate a zoom box operation. |
| 16 | "pencil" | N | Indicates that a click will result in the next step in some kind of construction or drawing operation. |
| 17 | "hide" | N | Indicates that a click will hide the underlying object. |
| 18 | "show" | Y | Indicates that a click will show the underlying object. |
| 19 | "clear" | Y | Indicates that a click will delete the underlying object. |
| 20 | "animate" | N | Indicates that a click will animate the underlying object. |
| 21 | "text" | Y | Indicates that the underlying object is text and that a click will initiate an edit of that text. |
| 22 | "link select" | Y | Used as part of a linking operation to indicate that the underlying object is available to be linked to. |
| 23 | "unavailable" | Y | The current operation is unavailable for the underlying object. |
| 24 | "wait busy" | Y | Used by the system to indicate that the handheld is busy doing work. |
| 25 | "hollow pointer" | N | Used to indicate that a click will select or activate the underlying object |
| 26 | "excel plus" | N | Indicates the location suitable for initiation of a drag to fill operation. |

The initial interpretation of a click on the touchpad 106 is performed by software instructions executed on the handheld device 100. In one or more embodiments, the memory unit 112 (a computer readable medium) stores the software instructions, which implement an embodiment of the method for interpreting clicks of FIG. 3. As is explained in more detail in reference to the method of FIG. 3, for designated cursors, a click anywhere on the touchpad 106 causes the action associated with the current cursor to be performed; for other cursors, only a click performed directly over the center click area 200 causes the action associated with the cursor to be performed.

In the example set of cursors of Table 1, the column labeled "Center Click Only?" indicates which cursors may be activated by a click anywhere on the touchpad 106 with an "N" and which cursors are activated only by a click on the center click area 200 with a "Y". The particular cursors that are designated as not requiring a click on the center click area 200 to cause the associated action to be performed are those cursors for which a user is unlikely to click on the arrows to move the cursor before clicking to perform the associated action.

Figure 3:
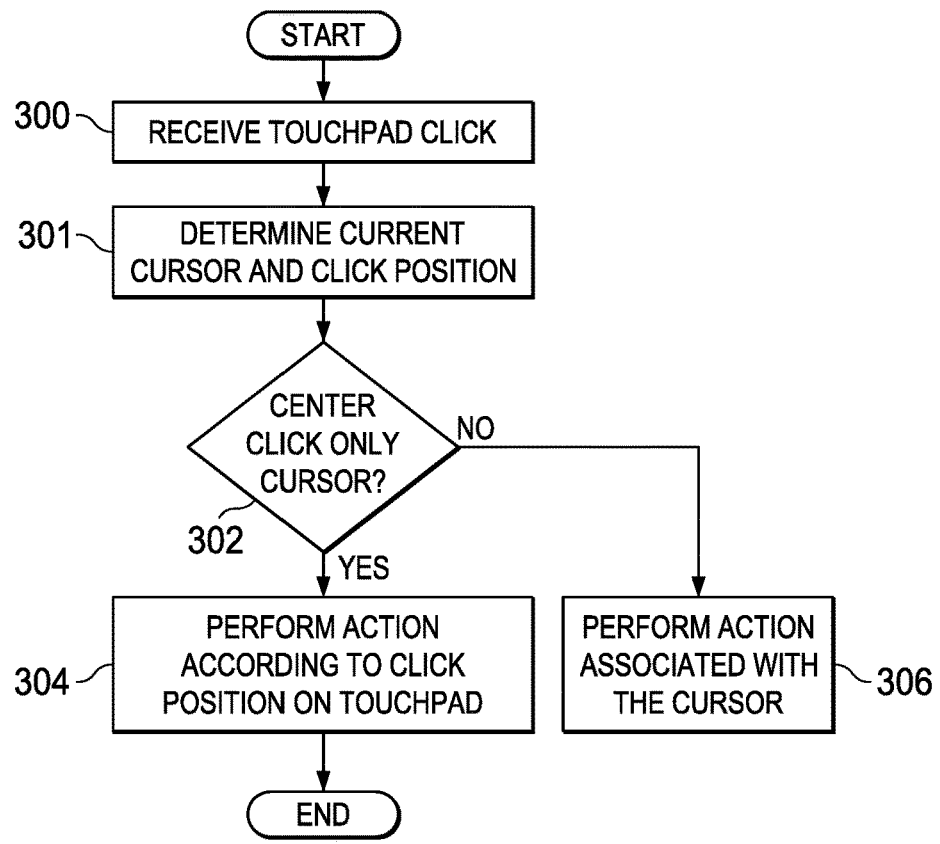
FIG. 3 is a method for interpreting clicks on a multi-function input device.

FIG. 3 is a flow diagram of a method for interpreting clicks on a multi-function input device, e.g., the touchpad 106 of FIGS. 1 and 2. For simplicity of explanation, the method is explained in reference to handheld device 100 of FIG. 1 in which the multi-function input device is the switch mounted touchpad 106. One of ordinary skill in the art will understand embodiments for other multi-function input devices. As shown in FIG. 3, initially a click is received 300 from the touchpad 106. The position of the user's finger on the touchpad 106 when the touchpad 106 was pressed to cause the click, i.e., the click position, and the cursor currently being displayed are also determined 301.

If the cursor currently being displayed is one that is designated 302 as a "center click only" cursor, then an action is performed 304 according to the click position on the touchpad 106. If the click position is on the center click area 200, then the action associated with the displayed cursor is performed. If the click position is not on the center click area 200, then movement on the display 104 is performed in the direction of the arrow closest to the click position. More specifically, the click is interpreted as one of five different user actions, left arrow, right arrow, up arrow, down arrow and center click, based on the finger position on the touchpad 106 at the time of click.

If the cursor currently being displayed is not one that is designated 302 as a "center click only" cursor, then the action associated with the cursor is performed 306. The action is performed regardless of the click position. That is, the click position may be anywhere on the touchpad 106, including on an outside edge.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in reference to a handheld device. As used herein, a handheld device is a digital device, e.g., a computing device, personal digital assistant, cell phone, graphing calculator, or tablet, small enough to be held in one hand. In addition, one of ordinary skill in the art will understand embodiments for any suitably configured digital device including a multi-function input device that is not a handheld device, e.g., a laptop or tablet including a touchpad or a desktop computer with keyboard including a multi-function input device.

In another example, embodiments have been described herein in which the multi-function input device is assumed to be a switch mounted touchpad. One of ordinary skill in the art will understand embodiments in which the multi-function input device is not a switch mounted touchpad. For example, the multi-function input device may be a touchpad that does not require pressing a switch to indicate a click, e.g., a touchpad in which clicks are indicated by tapping a fingertip on the touchpad.

In another example, embodiments have been described herein in which a click on a center position of a multi-function input device is required to cause an action associated with some displayed cursors to be performed. One of ordinary skill in the art will understand embodiments in which the click position on the multi-function input device is a specific position other than the center position.

Software instructions implementing all or portions of the method described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if one device couples to another device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the invention.

What is claimed is:

1. A method for interpreting clicks on a multi-function input device comprised in a digital device, the method comprising:
   receiving a click from the multi-function input device;
   determining a position of the click on the multi-function input device and a cursor displayed on a display comprised in the digital device;
   performing an action according to the position of the click when the cursor is a cursor designated as a cursor requiring a click at a specific position on the multi-function input device; and
   performing an action associated with the cursor when the cursor is not a cursor designated as a cursor requiring a click at a specific position on the multi-function input device.

2. The method of claim 1, wherein the digital device is a handheld device.

3. The method of claim 1, wherein the handheld device is a graphing calculator.

4. The method of claim 1, wherein the specific position is a center position on the multi-function input device.

5. The method of claim 1, wherein the multi-function input device is a switch mounted touchpad.

6. A digital device comprising:
a multi-function input device;
a display;
a memory storing software instructions for interpreting clicks on the multi-function device, wherein the software instructions comprise software instructions to:
receive a click from the multi-function input device;
determine a position of the click on the multi-function input device and a cursor displayed on the display;
perform an action according to the position of the click when the cursor is a cursor designated as a cursor requiring a click at a specific position on the multi-function input device; and
perform an action associated with the cursor when the cursor is not a cursor designated as a cursor requiring a click at a specific position on the multi-function input device; and
a processor coupled to the memory to execute the software instructions.

7. The digital device of claim 6, wherein the digital device is a handheld device.

8. The digital device of claim 7, wherein the handheld device is a graphing calculator.

9. The digital device of claim 6, wherein the specific position is a center position on the multi-function input device.

10. The digital device of claim 6, wherein the multi-function input device is a switch mounted touchpad.

11. A method for interpreting clicks on a switch mounted touchpad comprised in a handheld device, the method comprising:
receiving a click from the touchpad;
determining a position of the click on the touchpad and a cursor displayed on a display comprised in the digital device;
performing an action according to the position of the click when the cursor is a cursor designated as a cursor requiring a click at a center position on the touchpad; and
performing an action associated with the cursor when the cursor is not a cursor designated as a cursor requiring a click at a center position on the touchpad.

12. The method of claim 11, wherein the handheld device is a graphing calculator.

13. A handheld device comprising:
a switch mounted touchpad;
a display;
a memory storing software instructions for interpreting clicks on the touchpad, wherein the software instructions comprise software instructions to:
receive a click from the touchpad;
determine a position of the click on the touchpad and a cursor displayed on the display;
perform an action according to the position of the click when the cursor is a cursor designated as a cursor requiring a click at a center position on the touchpad; and
perform an action associated with the cursor when the cursor is not a cursor designated as a cursor requiring a click at a center position on the touchpad; and
a processor coupled to the memory to execute the software instructions.

14. The handheld device of claim 13, wherein the handheld device is a graphing calculator.

* * * * *